United States Patent
Cottrell et al.

(10) Patent No.: US 10,637,831 B2
(45) Date of Patent: Apr. 28, 2020

(54) METHOD AND APPARATUS FOR TRANSMITTING NETWORK TRAFFIC VIA A PROXY DEVICE

(71) Applicant: NTREPID, LLC, Herndon, VA (US)

(72) Inventors: Lance M. Cottrell, Healdsburg, CA (US); William Wesley Cassis, San Diego, CA (US); Geoffrey Kendall Abbott, San Diego, CA (US); Jason Michael Mansfield, Sunnyvale, CA (US)

(73) Assignee: NTREPID, LLC, Herndon, VA (US)

( * ) Notice: Subject to any disclaimer, the term of this patent is extended or adjusted under 35 U.S.C. 154(b) by 63 days.

(21) Appl. No.: 14/169,989

(22) Filed: Jan. 31, 2014

(65) Prior Publication Data

US 2015/0222600 A1    Aug. 6, 2015

(51) Int. Cl.
   *G06F 7/04*     (2006.01)
   *H04L 29/06*    (2006.01)
   *H04W 84/12*    (2009.01)

(52) U.S. Cl.
   CPC ...... *H04L 63/0281* (2013.01); *H04L 63/0407* (2013.01); *H04W 84/12* (2013.01)

(58) Field of Classification Search
   CPC ....... G06F 21/60–6218; H04L 63/0281; H04L 63/0407; H04W 12/08; H04W 84/12
   USPC .......................................................... 726/12
   See application file for complete search history.

(56) References Cited

U.S. PATENT DOCUMENTS

| | | | |
|---|---|---|---|
| 2002/0032766 A1* | 3/2002 | Xu .................. | H04L 29/06 709/223 |
| 2003/0211840 A1* | 11/2003 | Castrogiovanni ... | H04M 15/745 455/405 |
| 2005/0198261 A1* | 9/2005 | Durvasula .......... | H04L 12/5695 709/224 |
| 2007/0022174 A1* | 1/2007 | Issa .................. | H04L 67/104 709/217 |
| 2010/0014459 A1* | 1/2010 | Mir .................. | H04L 29/12386 370/328 |
| 2013/0021933 A1* | 1/2013 | Kovvali ............ | H04W 28/0236 370/252 |
| 2015/0026302 A1* | 1/2015 | Yamada ............ | H04L 12/2812 709/218 |

OTHER PUBLICATIONS

Sajal K. Das et al., Handbook on Securing Cyber-Physical Critical Infrastructure, Jan. 25, 2012, p. 765.*

* cited by examiner

*Primary Examiner* — Samson B Lemma
(74) *Attorney, Agent, or Firm* — Squire Patton Boggs (US) LLP

(57) ABSTRACT

A method and apparatus can be configured to initiate a request for connection with a user device. The method can include connecting to the user device. The method can also include connecting to a target device using an identifier of the proxy device. The user device is connected to the target device via the proxy device. An identifier of the user device is hidden from the target device. The target device identifies the user device using the identifier of the proxy device.

22 Claims, 9 Drawing Sheets

METHOD AND APPARATUS FOR TRANSMITTING NETWORK TRAFFIC VIA A PROXY DEVICE

BACKGROUND

Field

Embodiments of the invention relate to transmitting network traffic via a connection initiated by a proxy device.

Description of the Related Art

A proxy server/device can operate as an intermediary device that coordinates network traffic that is transmitted between a user device and a target device. Once a connection is established between the user device and the proxy device, the user device can request a service from the proxy device. Services can include, but are not limited to, the delivery of data relating to a web page, the establishment of a connection, the delivery of data relating to a file, or the delivery of some other resource that is available on the target device.

SUMMARY

According to a first embodiment, a method can include initiating, by a proxy device, a request for connection with a user device. The method can also include connecting to the user device. The method can also include connecting to a target device using an identifier of the proxy device. The user device may be connected to the target device via the proxy device. An identifier of the user device may be hidden from the target device. The target device identifies the user device using the identifier of the proxy device.

In the method of the first embodiment, the connecting to the target device includes using an internet protocol address of the proxy device.

In the method of the first embodiment, the connecting to the user device comprises connecting to the user device through an introducer server.

In the method of the first embodiment, the proxy device may be a mobile device. The identifier of the proxy device may be provided by a service provider of the mobile device.

In the method of the first embodiment, the proxy device accesses the internet using a WiFi base station. The internet protocol address of the proxy device may be assigned by the WiFi base station. The internet protocol address may be non-routable. The internet protocol address changes as the proxy device accesses the internet using a different WiFi base station.

In the method of the first embodiment, the internet protocol address of the proxy device may be a dynamic internet protocol address.

In the method of the first embodiment, the proxy device may be connected to a network behind a Network Address Translation server.

According to a second embodiment, an apparatus can include at least one processor. The apparatus can include at least one memory including computer program code. The at least one memory and the computer program code can be configured, with the at least one processor, to cause the apparatus at least to initiate a request for connection with a user device. The apparatus can also connect to the user device. The apparatus can also connect to a target device using an identifier of the apparatus. The user device may be connected to the target device via the apparatus. An identifier of the user device may be hidden from the target device. The target device identifies the user device using the identifier of the apparatus.

In the apparatus of the second embodiment, the connecting to the target device includes using an internet protocol address of the apparatus.

In the apparatus of the second embodiment, the connecting to the user device comprises connecting to the user device through an introducer server.

In the apparatus of the second embodiment, the apparatus may be a mobile device. The identifier of the apparatus may be provided by a service provider of the mobile device.

In the apparatus of the second embodiment, the apparatus accesses the internet using a WiFi base station. The internet protocol address of the apparatus may be assigned by the WiFi base station. The internet protocol address may be non-routable. The internet protocol address changes as the proxy device accesses the internet using a different WiFi base station.

In the apparatus of the second embodiment, the internet protocol address of the apparatus may be a dynamic internet protocol address.

In the apparatus of the second embodiment, the apparatus may be connected to a network behind a Network Address Translation server.

According to a third embodiment, a computer program product can be embodied on a non-transitory computer readable medium. The computer program product can be configured to control a processor to perform a process including initiating, by a proxy device, a request for connection with a user device. The process can also include connecting to the user device. The process can also include connecting to a target device using an identifier of the proxy device. The user device may be connected to the target device via the proxy device. An identifier of the user device may be hidden from the target device. The target device identifies the user device using the identifier of the proxy device.

According to a fourth embodiment, a method can include establishing, by a user device, a connection with a proxy device. The connection may be initiated by the proxy device. The method can also include connecting to a target device via the proxy device. An identifier of the user device may be hidden from the target device. The target device identifies the user device using an identifier of the proxy device.

In the method of the fourth embodiment, the connecting to the target device includes using an internet protocol address of the proxy device.

In the method of the fourth embodiment, the establishing the connection with the proxy device comprises connecting to the proxy device through an introducer server.

In the method of the fourth embodiment, the proxy device may be a mobile device, and the identifier of the proxy device may be provided by a service provider of the mobile device.

In the method of the fourth embodiment, the proxy device accesses the internet using a WiFi base station. The internet protocol address of the proxy device may be assigned by the WiFi base station. The internet protocol address may be non-routable. The internet protocol address changes as the proxy device accesses the internet using a different WiFi base station.

In the method of the fourth embodiment, the internet protocol address of the proxy device may be a dynamic internet protocol address.

In the method of the fourth embodiment, the proxy device may be connected to a network behind a Network Address Translation server.

According to a fifth embodiment, an apparatus can include at least one processor. The apparatus can also include at least one memory including computer program code. The at least one memory and the computer program code can be configured, with the at least one processor, to cause the apparatus at least to establish, by the apparatus, a connection with a proxy device, wherein the connection may be initiated by the proxy device. The apparatus can also connect to a target device via the proxy device. An identifier of the apparatus may be hidden from the target device. The target device identifies the apparatus using an identifier of the proxy device.

In the apparatus of the fifth embodiment, the connecting to the target device includes using an internet protocol address of the proxy device.

In the apparatus of the fifth embodiment, the establishing the connection with the proxy device comprises connecting to the proxy device through an introducer server.

In the apparatus of the fifth embodiment, the proxy device may be a mobile device, and the identifier of the proxy device may be provided by a service provider of the mobile device.

In the apparatus of the fifth embodiment, the proxy device accesses the internet using a WiFi base station. The internet protocol address of the proxy device may be assigned by the WiFi base station. The internet protocol address may be non-routable. The internet protocol address changes as the proxy device accesses the internet using a different WiFi base station.

In the apparatus of the fifth embodiment, the internet protocol address of the proxy device may be a dynamic internet protocol address.

In the apparatus of the fifth embodiment, the proxy device may be connected to a network behind a Network Address Translation server.

According to a sixth embodiment, a computer program product can be embodied on a non-transitory computer readable medium. The computer program product can be configured to control a processor to perform a process including establishing, by a user device, a connection with a proxy device. The connection may be initiated by the proxy device. The process can include connecting to a target device via the proxy device. An identifier of the user device may be hidden from the target device. The target device identifies the user device using an identifier of the proxy device.

BRIEF DESCRIPTION OF THE DRAWINGS

For proper understanding of the invention, reference should be made to the accompanying drawings, wherein.

DETAILED DESCRIPTION

Figure 1:
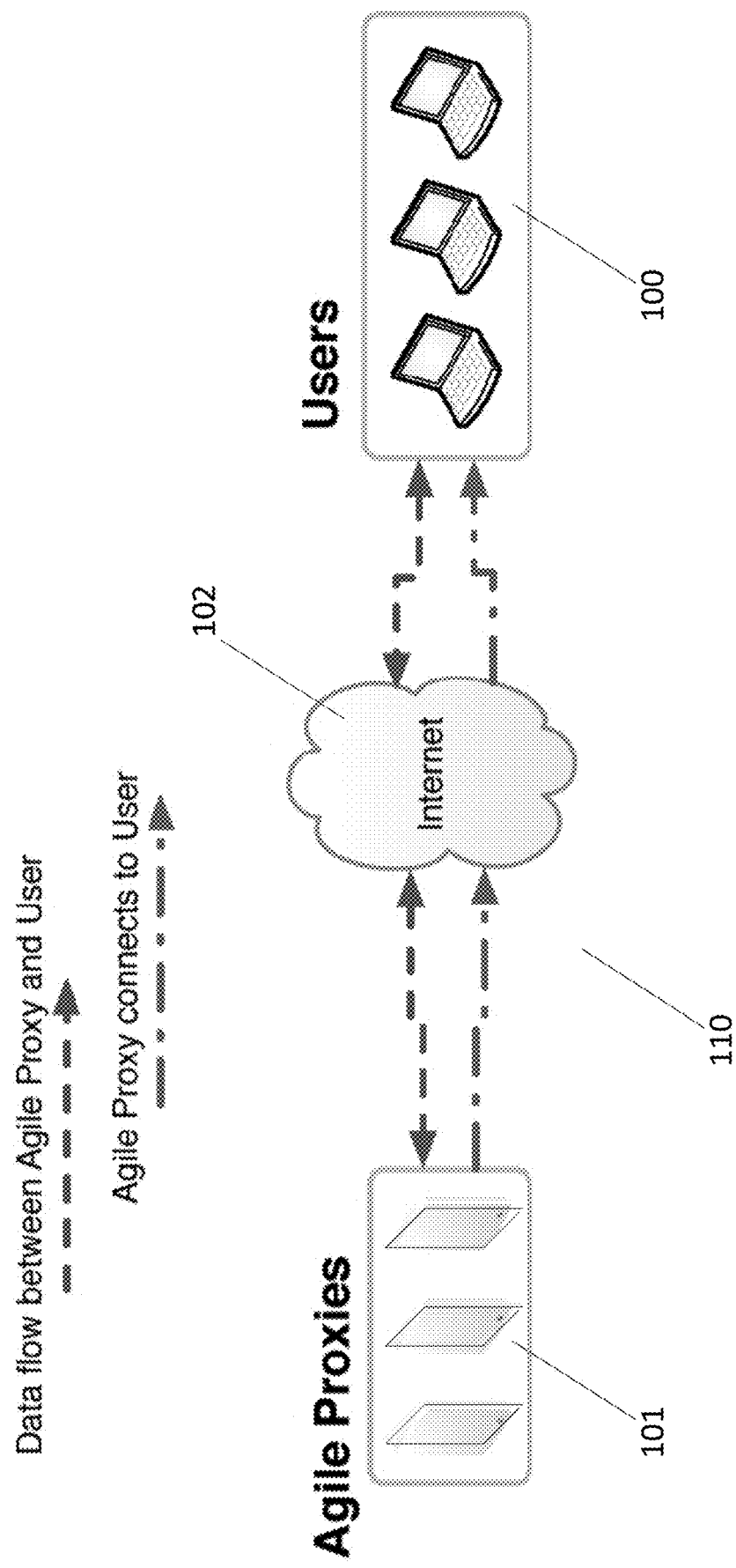
FIG. 1 illustrates a network configuration in accordance with embodiments of the present invention.

Embodiments of the present invention are related to transmitting network traffic via a proxy device. A connection between the proxy device and a user device is established after the proxy device initiates the connection with the user device. The proxy device can be a non-addressable device that has a changing/indeterminate address.

A proxy device is generally understood as a gateway through which network traffic is transmitted. Typically, a proxy device can be implemented on a server. In general, a proxy device acts as an intermediary device that relays network traffic between a user device and a target device.

As described above, a connection can be established between a user device (such as a user computer) and a proxy device. Next, the proxy device can establish a connection to a target device. Once the connection between the proxy device and the target device is established, the user device can connect to the target device through the proxy device. Although the user device can access the target device, from the perspective of the target device, any traffic that originates from the user device appears to instead originate from the proxy device (and not from the user device). Further, from the perspective of the target device, any traffic that is transmitted from the target device appears to be transmitted to the proxy device. As such, by establishing the proxy device as an intermediary between the user device and the target device, any identifier of the user device (such as an internet protocol (IP) address) is hidden from the target device because the user device is assigned the IP address of the proxy device. In other words, the target device recognizes the IP address of the proxy device as being the IP address of the user device.

The previous approaches of establishing connections between user devices, proxy devices, and target devices do not enable a user device to connect to a proxy device unless the proxy device can be addressed directly and/or has a fixed IP address. In other words, using the previous approaches, user devices would not be able to connect to proxy devices which do not have fixed IP addresses, and/or which cannot be addressed directly.

For example, using the previous approaches, it is not possible for a user device to consider a mobile phone to be a proxy device. The user device generally cannot initiate any request for the mobile phone to be a proxy device because the mobile phone generally does not support receiving such inbound requests for establishing connections. The previous approaches also generally do not contemplate running a proxy server nor a web server on mobile phones. Mobile phones generally are not associated with IP addresses that are addressable (i.e., IP addresses that IP packets can be sent to). According to the previous approaches, mobile phones generally make connections through outgoing requests from the mobile phones.

Further, according to the previous approaches, in the event that a proxy device is behind a network-address translation (NAT) server, and is not associated with a predictable IP address, the user device generally cannot initiate any connection to the proxy device.

The previous approaches also do not contemplate implementing a proxy device using a device that has a moving/changing IP address. In the previous approaches, the proxy device is generally implemented on a device that is associated with a static IP address. Specifically, according to the previous approaches, proxy devices are normally implemented on fixed servers, such as servers within a corporate network, for example. As such, even if the servers of the previous approaches are used to preserve anonymity, such servers are still addressable In contrast to the previous approaches, in embodiments of the present invention, a proxy device initiates an outbound request for connection to a user device (as opposed to having the user device initiate the request for connection to the proxy device), and then the user device can use the initiated connection (initiated by the proxy device) to connect back to the proxy device. In other words, a proxy device first initiates communication to the user device to establish the connection, and the user device then reverses the flow of communication to transmit network traffic to the proxy device. In certain embodiments of the present invention, the proxy device can be a mobile device or any other device that is using WiFi.

When the proxy device initiates the connection to the user device, the connection can be a virtual-private network (VPN) connection. The proxy device can initiate the connection either directly to the user device, or the proxy device can initiate the connection to the user device through some other addressable device that acts as an introducer server, as described in more detail below. In the case where the proxy device initiates the connection to the addressable introducer server, the user device can connect to the addressable introducer device as well. In this embodiment, the addressable device introduces the proxy device to the user device. Although a VPN connection is specifically mentioned above and below, the established connection is not limited to being a VPN connection. The connection can be a single protocol proxy, a multi-protocol proxy, Socket Secure (SOCKS) proxy, Secure Shell (SSH) port forwarding tunnel, or any other connection that can be used to tunnel communications.

In one embodiment, the proxy device can be a mobile phone. The IP address of such a proxy device can correspond to the IP address that is provided by the telecommunications company that services the mobile phone. As described above, the mobile phone can initiate a VPN connection to a user device, or the mobile phone can connect to an introducing device. By connecting to the introduction server, the proxy device can learn, from the introduction server, about which user devices to connect to.

Although one introduction device has been described above, other embodiments of the present invention can use a plurality of introduction devices to extend the connection path over a chain or tree of devices.

In another embodiment, the proxy device can be a device that accesses the Internet through a WiFi base station. The proxy device will generally use an IP address (a non-routable address) assigned by the WiFi base station. The IP address of the proxy device may vary because the WiFi base station may periodically change the IP address of the proxy device, or the IP address of the proxy device may vary because the proxy device can move from one WiFi network to another. The user device would thus be identified (by the target device) as having an IP address associated with a particular WiFi network, either a specifically-assigned real IP address, or a NAT IP address, if a non-routable address was assigned.

As described above, in embodiments of the present invention, once the user device is connected to the proxy device, and the proxy device is connected to the target device, the user device can be in communication with the target device through the proxy device. As described above, during the user device's communication with the target device, the target device cannot ascertain the actual IP address of the user device. When the target device transmits network traffic intended for the user device, this network traffic is first transmitted from the target device to the proxy device. The proxy device then forwards the received network traffic to the user device.

Further, in contrast to the previous approaches, even if the proxy device is behind a network-address-translation (NAT) device, and/or the proxy device does not have a predictable IP address, certain embodiments can enable the user device to nevertheless communicate with the proxy device (using a connection initiated by the proxy device) and then connect to the target device. The proxy device can operate even if the NAT does not provide port-forwarding or any other provisions for passing through firewalls. Port-forwarding can generally be considered to be a method of poking a hole in the NAT. As described above, embodiments of the present invention can be used without port-forwarding.

In view of the above, the proxy device can be considered to be an agile proxy. An agile proxy is generally considered to be a proxy device that has an unpredictable or unreachable IP address. The agile proxy device can have an IP address that may be unroutable. The agile proxy device may be configured behind a NAT device and/or a firewall. The agile proxy can be a device that generally initiates connections via outgoing requests to other devices, but does not allow these other devices to initiate inbound connections into the agile proxy.

In one embodiment of implementing a proxy device, the proxy device can search for a viable internet connection, and as soon as a viable internet connection is found by the proxy device, the proxy device can open a connection to the user or introducer and can activate its proxy functionality.

A proxy device (such as a mobile phone) can also poll user devices or introducers to determine whether a proxy VPN connection/tunnel should be opened. The polling can be performed to determine whether a proxy connection is needed. If a proxy connection is needed, the proxy device can initiate the connection to the user device or introducer.

FIG. 1 illustrates a network configuration in accordance with embodiments of the present invention. Referring to FIG. 1, user devices 100 (i.e., client devices) can be connected within network 110. Agile proxy devices 101 can also be connected within network 110. Network 110 may comprise a plurality of paths for communications. Mobile devices and WiFi devices can act as agile proxy devices. Agile proxy devices 101 can be connected to the user devices 100 via the internet 102.

Figure 2:
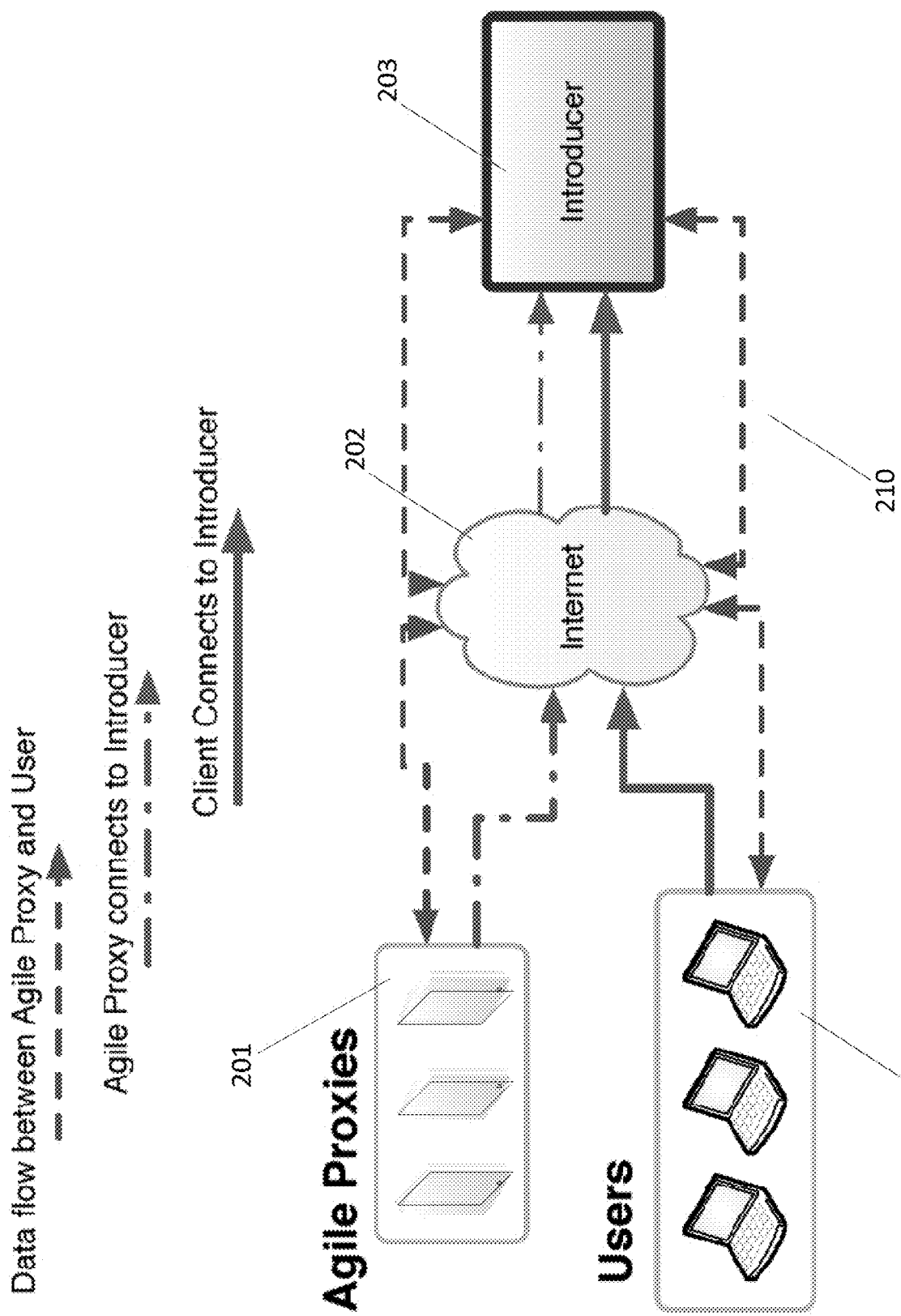
FIG. 2 illustrates a network configuration in accordance with another embodiment of the present invention.

FIG. 2 illustrates a network configuration in accordance with another embodiment of the present invention. Referring to FIG. 2, user devices 200 can be connected within network 210. Agile proxy devices 201 can also be connected within network 210. Network 210 may comprise a plurality of paths for communications. Agile proxy devices 201 can be connected to the user devices 200 via the internet 202. An introducer server 203 can also act as a middle-man between the user devices 200 and corresponding proxy devices 201. User devices 200 can connect to target devices (not shown) through proxy devices 201, introducer 203, and the internet 202.

Figure 3:
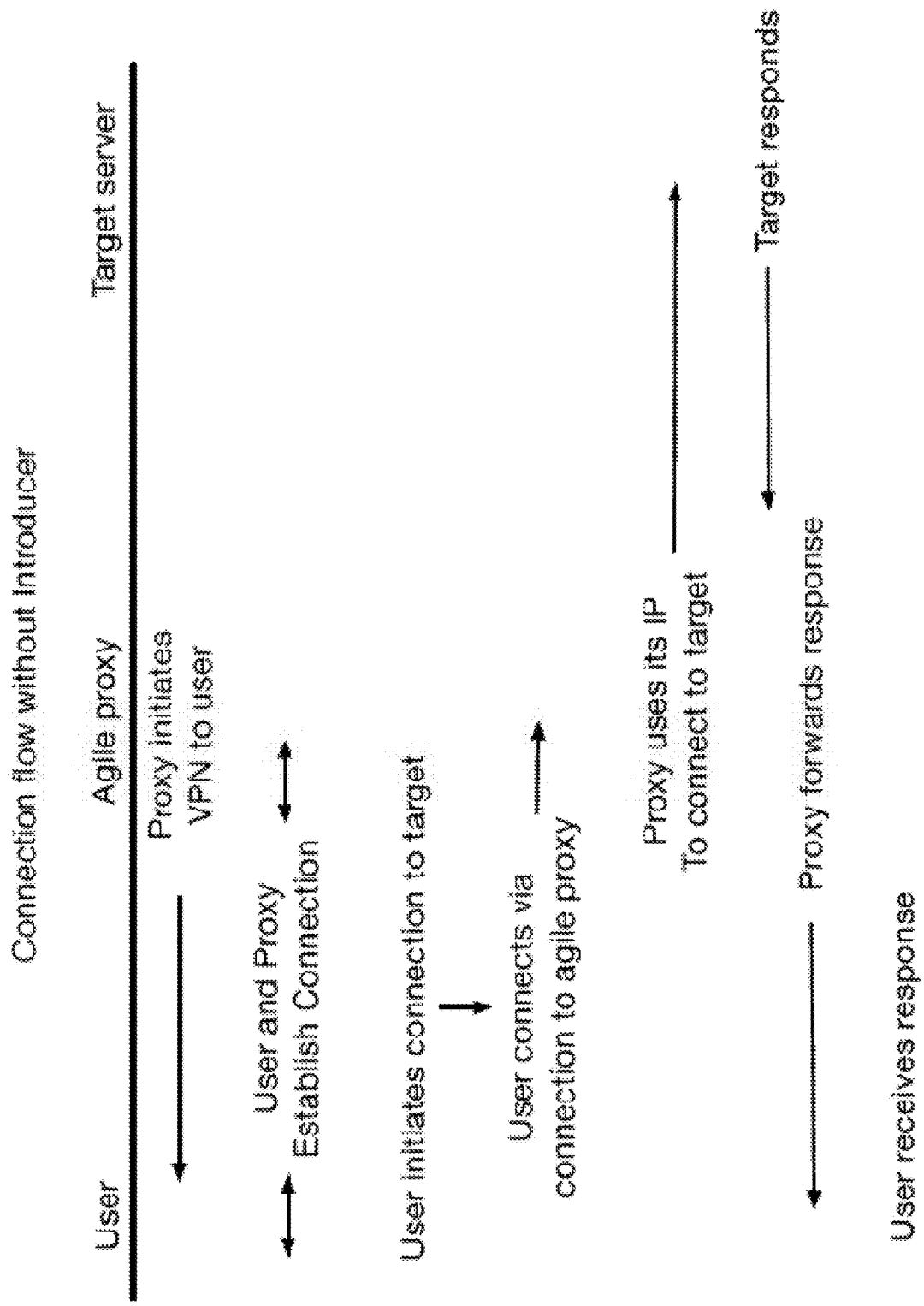
FIG. 3 illustrates a procedure of establishing connections between a user device, a proxy device, and a target device in accordance with one embodiment.

FIG. 3 illustrates a procedure of establishing connections between a user device, a proxy device, and a target device in accordance with one embodiment. Referring to FIG. 3, an agile proxy can first initiate a connection (such as a VPN connection) to a user device. Next, the user device can connect to the agile proxy over the previously-initiated VPN connection (initiated by the agile proxy). Next, the user device can initiate a connection to a target device. As described above, the user device connects to the target device via the agile proxy. Next, the proxy device uses its own IP address to connect to the target device. Once the target device receives the request of the proxy device, the target device can respond to the proxy device. Finally, the proxy device can forward the target device's response to the user device, and the user device receives the response of the target device.

Figure 4:
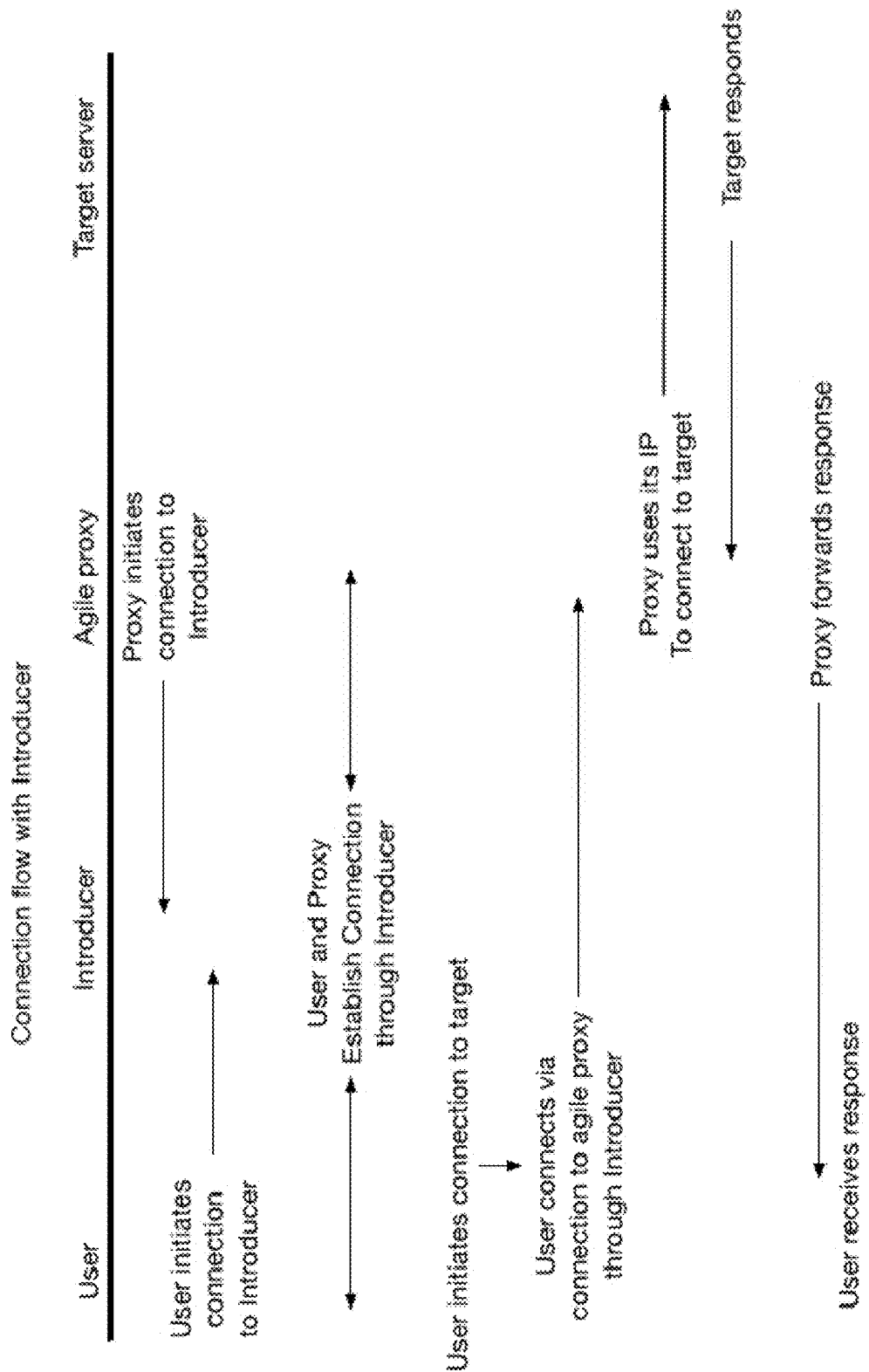
FIG. 4 illustrates a procedure of establishing connections between a user device, an introducer, a proxy device, and a target device in accordance with one embodiment.

FIG. 4 illustrates a procedure of establishing connections between a user device, an introducer, a proxy device, and a target device in accordance with one embodiment. Referring to FIG. 4, an agile proxy can initiate a connection (such as a VPN connection) to an introducer. A user device can also initiate a connection to the introducer. Next, the user device can be connected to the agile proxy through the introducer. The user can then initiate a connection to a target device. As described above, the user device connects to the target device via the introducer and the agile proxy. Next, the proxy device uses its own IP address to connect to the target device. Once the target device receives the request of the proxy device, the target device can respond to the proxy device. Finally, the proxy device can forward the target device's response to the user device, and the user device receives the response of the target device.

In view of the above, embodiments of the present invention enable the user device to proxy through the proxy device where the address of the proxy device is not known a priori. In certain embodiments, the user device can proxy through the proxy device even if the IP address of the proxy device changes between sessions (between sessions where the user device connects to the target device). In the event that the IP address of the proxy device changes, the proxy device can reinitiate/re-enable its connections to the user device.

As described above, in contrast to the previous approaches, in embodiments of the present invention, the connection between the proxy device and the user device is initiated by the proxy device, as opposed to being initiated by the user device. Under some circumstances, the user device may not be able to determine a priori how to reach the proxy device. In fact, the proxy device may not be able to be addressed at all. As such, in certain embodiments of the present invention, the proxy device will be the device which initiates the connection to the user device. The user device can then transmit network communication to the proxy device using the connection that was initiated by the proxy device.

If the connection between the proxy device and the user device fails, the proxy device may re-establish the connection when it is able to. The connection can fail due to a loss of connectivity, a change in the IP address of the proxy device, or for some other reason.

In one embodiment, a plurality of agile proxy devices can be used. If a plurality of proxy devices are used, the user device can automatically switch from one proxy device to another proxy device. Specifically, the user device can switch from a first proxy device to a second proxy device if the first proxy device becomes unavailable.

Although web proxies have been specifically mentioned above, the proxy device need not be limited to a web-proxy device. A proxy device is generally a device that can stand-in for a user device. The user device uses the identifier (such as an IP address) of the proxy device, and the proxy device stands-in for the user device as traffic is relayed between the user device and the target device. In one embodiment, the proxy device can initiate a virtual-private network (VPN) over a connection to the user device.

In view of the above, embodiments of the present invention configure a new routing topology. In contrast to the previous approaches, the routing topology of embodiments of the present invention enable a proxy device to call out to a user device, and the receiving user device then configures itself such that the incoming tunnel (from the initiating proxy device) becomes the default outgoing path for data transmitted by the user device (for some or all traffic).

In certain embodiments of the present invention, the proxy device can install proxy software, VPN software, and other software that reconfigures data packets received from the user device so that the proxy device can send these data packets as outgoing packets (from the proxy device) to a target device (as if the data packets originated from the proxy device itself).

In certain embodiments, the proxy device establishes a connection, and the user device establishes a VPN over that connection. The user device can configure routing tables to ensure that the traffic (that the user device wants to be proxied) will be transmitted through the VPN connection, rather than being transmitted through a normal default network connection. On the receiving end (at the target device), the packets will be received from the proxy device. As described above, the original IP address corresponding to the user device is replaced with the IP address associated with the proxy device. If the network containing the proxy device is so configured, the address visible to the target may not be the same as the address used by the proxy device. This would happen if the device was located in a network using a NAT router.

As described above, the user device can configure itself away from a normal configuration in order to transmit outgoing traffic via a VPN connection. By default, the user device transmits data packets via a normal gateway to the internet, and the transmitted data appears as originating from the user device. However, embodiments of the present invention configure the user device so that the traffic that should not be identifiable as originating from the user device will be transmitted via the VPN connection (as opposed to being transmitted via the normal gateway). In the case of using an introducer server, the user employs an ordinary VPN or other connection to the introducer server, with conventional routing, and the introducer employs routing rules to send traffic from the user to the proxy, and from the proxy to the user.

In view of the above, in contrast to the previous approaches, in embodiments of the present invention, the proxy device initiates the connection to the user device, and the user device uses the connection initiated by the proxy device to send communication to a target server. In other words, embodiments of the present invention reverse the typical roles of the user device and the proxy device, as compared to the previous approaches.

Figure 5:
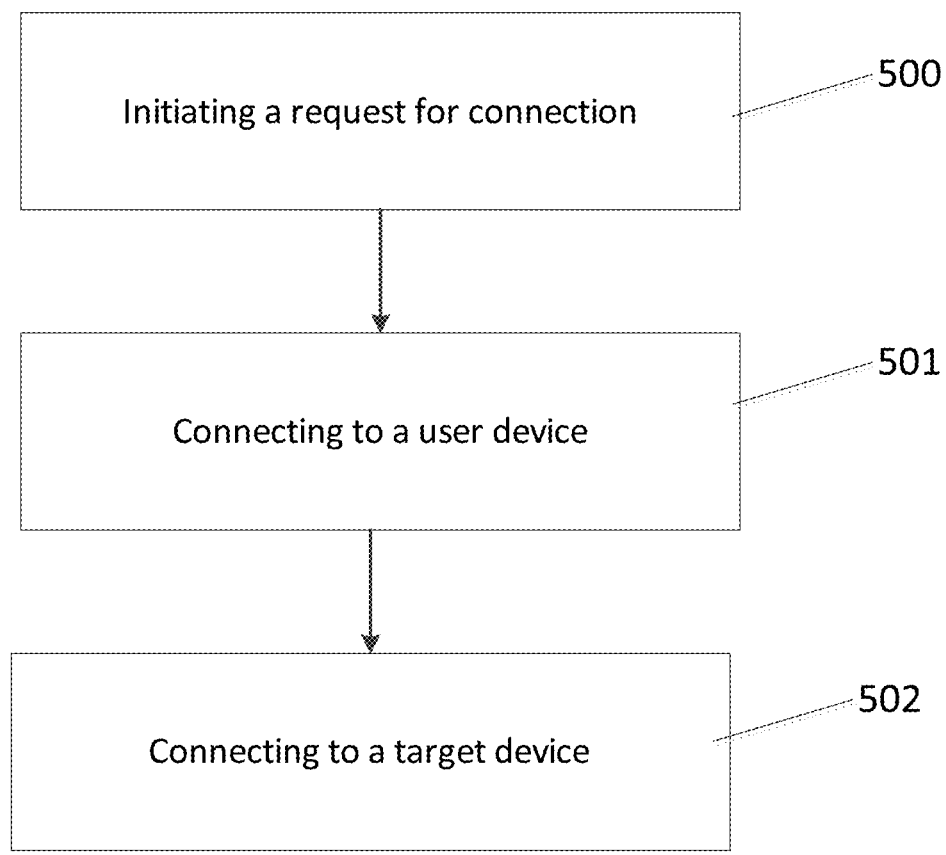
FIG. 5 illustrates a flowchart of a method in accordance with embodiments of the invention.

FIG. 5 illustrates a flowchart of a method in accordance with embodiments of the invention. The method illustrated in FIG. 5 includes, at 500, initiating, by a proxy device, a request for connection with a user device. The method can also include, at 501, connecting to the user device. The method can also include, at 502, connecting to a target device using an identifier of the proxy device. The user device is connected to the target device via the proxy device. An identifier of the user device is hidden from the target device. The target device identifies the user device using the identifier of the proxy device.

Figure 6:
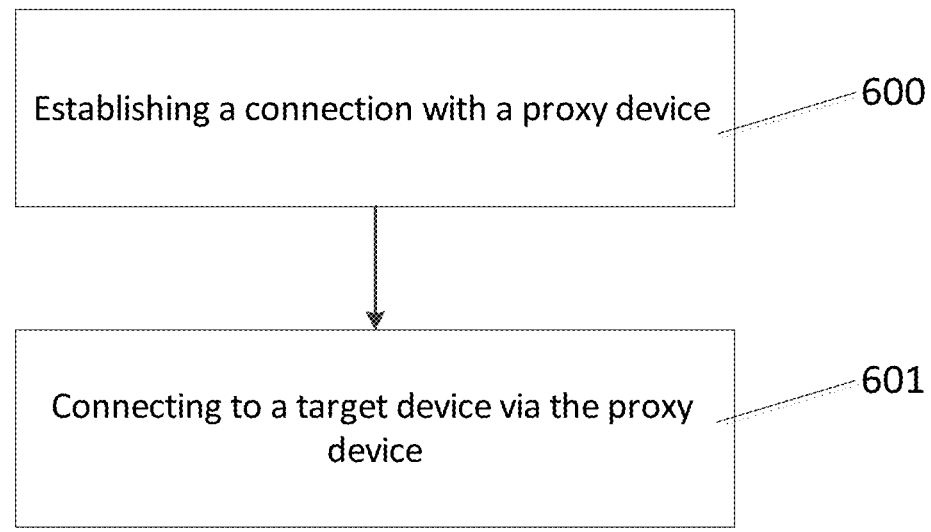
FIG. 6 illustrates a flowchart of a method in accordance with embodiments of the invention.

FIG. 6 illustrates a flowchart of a method in accordance with embodiments of the invention. The method illustrated in FIG. 6 includes, at 600, establishing, by a user device, a connection with a proxy device. The connection is initiated by the proxy device. The method also includes, at 601, connecting to a target device via the proxy device. An identifier of the user device is hidden from the target device. The target device identifies the user device using an identifier of the proxy device.

Figure 7:
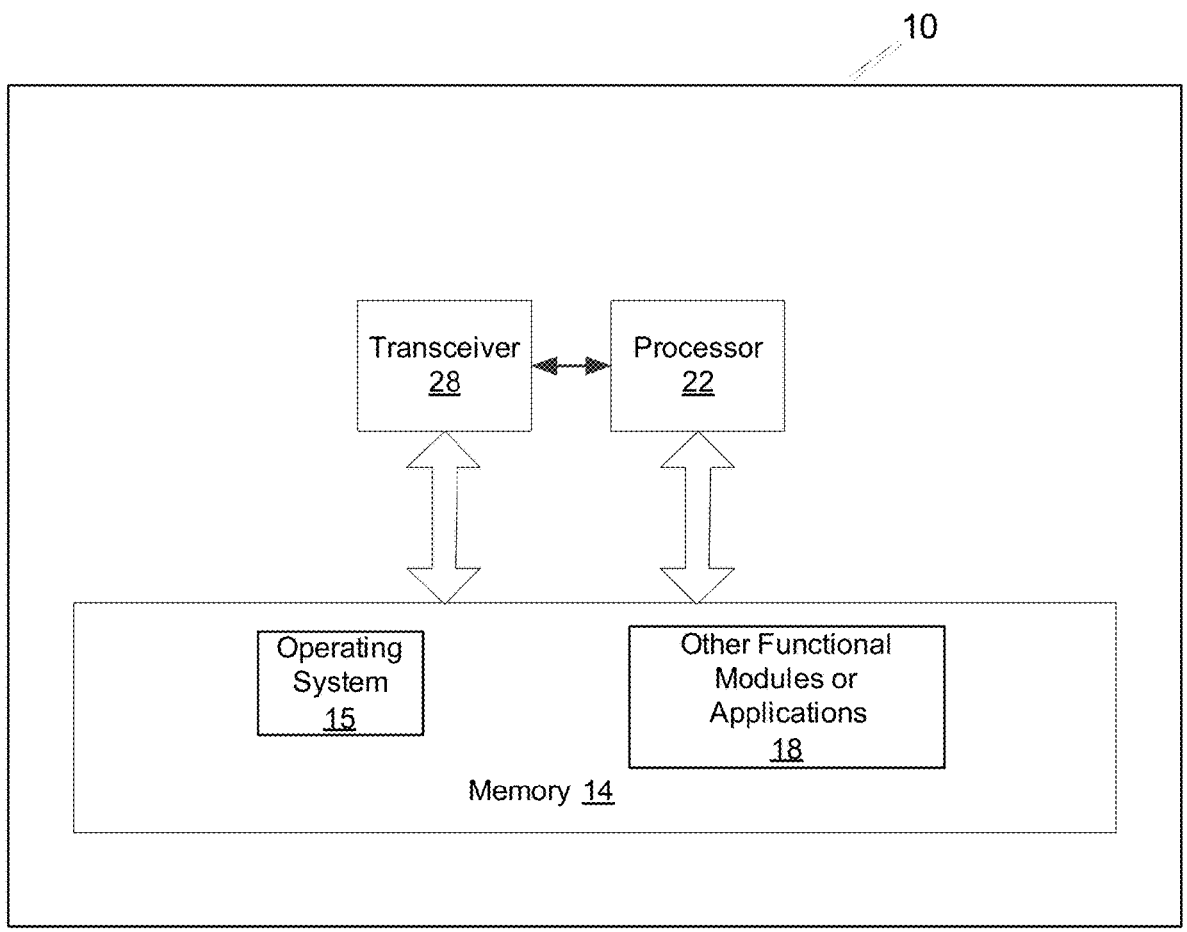
FIG. 7 illustrates an apparatus in accordance with embodiments of the invention.

FIG. 7 illustrates an apparatus in accordance with an embodiment of the invention. In one embodiment, the apparatus can be a user device. In another embodiment, the apparatus can be a proxy device. In another embodiment, the apparatus can be a target device. Apparatus 10 can include a processor 22 for processing information and executing instructions or operations. Processor 22 can be any type of general or specific purpose processor. While a single processor 22 is shown in FIG. 7, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
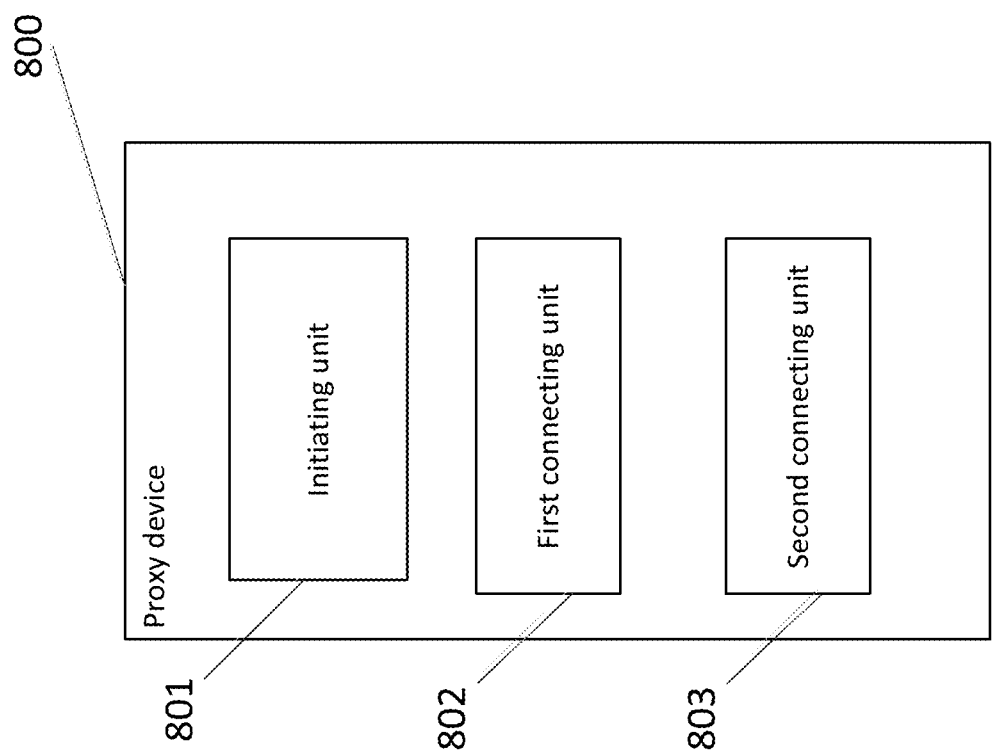
FIG. 8 illustrates an apparatus in accordance with embodiments of the invention.

FIG. 8 illustrates an apparatus in accordance with another embodiment. Apparatus 800 can be a proxy device, for example. Apparatus 800 can include an initiating unit 801 that initiates a request for connection with a user device. Apparatus 800 can include a first connecting unit 802 that connects to the user device. Apparatus 800 can also include a second connecting unit 803 that connects to a target device using an identifier of the proxy device. The user device is connected to the target device via the proxy device. An identifier of the user device is hidden from the target device. The target device identifies the user device using the identifier of the proxy device.

Figure 9:
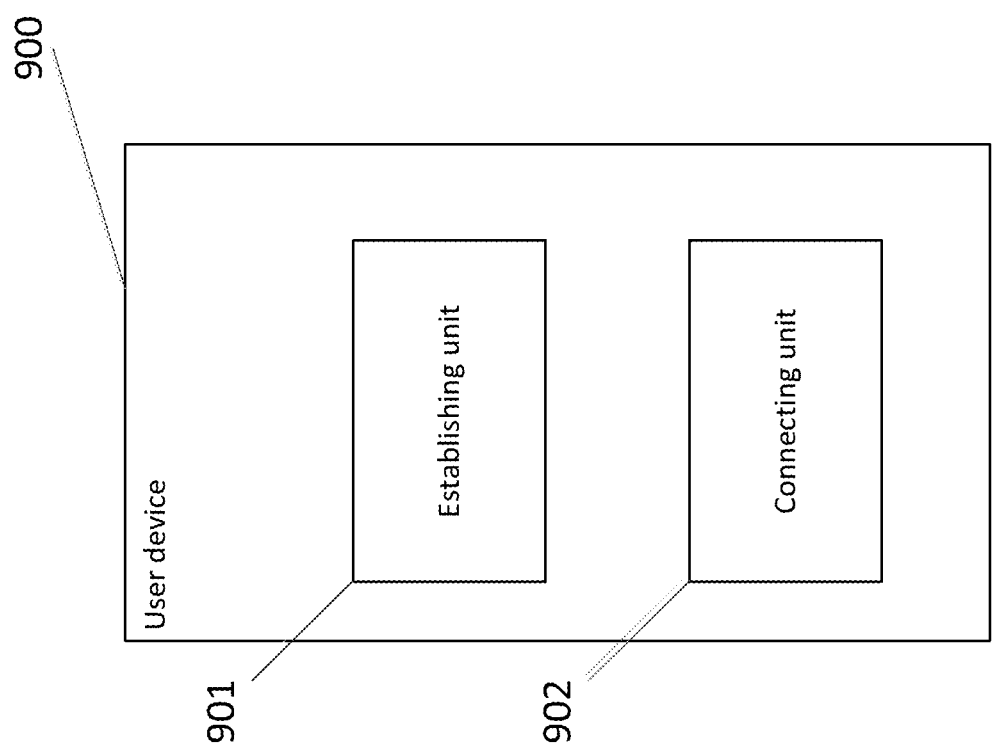
FIG. 9 illustrates an apparatus in accordance with embodiments of the invention.

FIG. 9 illustrates an apparatus in accordance with another embodiment. Apparatus 900 can be a user device, for example. Apparatus 900 can include an establishing unit 901 that establishes a connection with a proxy device. The connection is initiated by the proxy device. Apparatus 900 can also include a connecting unit 902 that connects to a target device via the proxy device. An identifier of the user device is hidden from the target device. The target device identifies the user device using an identifier of the proxy device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:

initiating, by a proxy device, a connection with an introducer server before a user computer initiates a connection with the introducer server;

connecting to the user computer, wherein the initiating by the proxy device occurs before the connecting to the user computer, and a connection between the user computer and the proxy device is first requested by the proxy device; and connecting, by the proxy device, directly to a target device using an identifier of the proxy device, wherein the user computer is connected to the target device via the introducer server and the proxy device, an identifier of the user computer is hidden from the target device, and the target device identifies the user computer using the identifier of the proxy device, wherein the proxy device is a mobile device having a non-static or unpredictable internet protocol address, wherein the connecting to the target device comprises using the internet protocol address of the proxy device, wherein the proxy device accesses the internet using a WiFi base station, the internet protocol address of the proxy device is assigned by the WiFi base station, the internet protocol address is non-routable, and the internet protocol address changes as the proxy device accesses the internet using a different WiFi base station, and wherein the internet protocol address of the proxy device is associated with a network of the WiFi base station.

2. The method according to claim 1, wherein the connecting to the user computer comprises connecting to the user computer through the introducer server.

3. The method according to claim 1, wherein the identifier of the proxy device is provided by a service provider of the mobile device.

4. The method according to claim 1, wherein the internet protocol address of the proxy device is a dynamic internet protocol address.

5. The method according to claim 1, wherein the proxy device is connected to a network behind a Network Address Translation server.

6. An apparatus, comprising:
at least one processor; and
at least one memory including computer program code,
the at least one memory and the computer program code configured, with the at least one processor, to cause the apparatus at least to
initiate a connection with an introducer server before a user computer initiates a connection with the introducer server;
connect to the user computer, wherein the initiating by the proxy device occurs before the connecting to the user computer, and a connection between the user computer and the apparatus is first requested by the apparatus; and
connect directly to a target device using an identifier of the apparatus,
wherein the user computer is connected to the target device via the introducer server and the apparatus, an identifier of the user computer is hidden from the target device, and the target device identifies the user computer using the identifier of the apparatus,
wherein the apparatus is a mobile device having a non-static or unpredictable internet protocol address,
wherein the connecting to the target device comprises using the internet protocol address of the apparatus,
wherein the apparatus accesses the internet using a WiFi base station, the internet protocol address of the proxy device is assigned by the WiFi base station, the internet protocol address is non-routable, and the internet protocol address changes as the apparatus accesses the internet using a different WiFi base station, and
wherein the internet protocol address of the apparatus is associated with a network of the WiFi base station.

7. The apparatus according to claim 6, wherein the connecting to the user computer comprises connecting to the user computer through the introducer server.

8. The apparatus according to claim 6, wherein the identifier of the apparatus is provided by a service provider of the mobile device.

9. The apparatus according to claim 6, wherein the internet protocol address of the apparatus is a dynamic internet protocol address.

10. The apparatus according to claim 6, wherein the apparatus is connected to a network behind a Network Address Translation server.

11. A computer program product, embodied on a non-transitory computer readable medium, the computer program product configured to control a processor to perform a process, comprising:

initiating, by a proxy device, a connection with an introducer server before a user computer initiates a connection with the introducer server;
connecting to the user computer, wherein the initiating by the proxy device occurs before the connecting to the user computer, and a connection between the user computer and the proxy device is first requested by the proxy device; and
connecting, by the proxy device, directly to a target device using an identifier of the proxy device,
wherein the user computer is connected to the target device via the introducer server and the proxy device, an identifier of the user computer is hidden from the target device, and the target device identifies the user computer using the identifier of the proxy device,
wherein the proxy device is a mobile device having a non-static or unpredictable internet protocol address,
wherein the connecting to the target device comprises using the internet protocol address of the proxy device,
wherein the proxy device accesses the internet using a WiFi base station, the internet protocol address of the proxy device is assigned by the WiFi base station, the internet protocol address is non-routable, and the internet protocol address changes as the proxy device accesses the internet using a different WiFi base station, and
wherein the internet protocol address of the proxy device is associated with a network of the WiFi base station.

12. A method, comprising:
initiating, by a user computer, a connection with an introducer server after a connection to the introducer server is initiated by a proxy device, wherein the initiating by the proxy device occurs before a connection to the proxy device is established, and the connection between the user computer and the proxy device is first requested by the proxy device; and
connecting to a target device via the introducer server and the proxy device,
wherein an identifier of the user computer is hidden from the target device, and the target device identifies the user computer using an identifier of the proxy device,
wherein the proxy device is a mobile device having a non-static or unpredictable internet protocol address,
wherein the connecting to the target device comprises using the internet protocol address of the proxy device,
wherein the proxy device accesses the internet using a WiFi base station, the internet protocol address of the proxy device is assigned by the WiFi base station, the internet protocol address is non-routable, and the internet protocol address changes as the proxy device accesses the internet using a different WiFi base station, and
wherein the internet protocol address of the proxy device is associated with a network of the WiFi base station.

13. The method according to claim 12, wherein the establishing the connection with the proxy device comprises connecting to the proxy device through the introducer server.

14. The method according to claim 12, wherein the identifier of the proxy device is provided by a service provider of the mobile device.

15. The method according to claim 12, wherein the internet protocol address of the proxy device is a dynamic internet protocol address.

16. The method according to claim 12, wherein the proxy device is connected to a network behind a Network Address Translation server.

17. An apparatus, comprising:
at least one processor; and
at least one memory including computer program code,
the at least one memory and the computer program code configured, with the at least one processor, to cause the apparatus at least to
initiate, by the apparatus, a connection with an introducer server after a connection to the introducer server is initiated by a proxy device, wherein the initiating by the proxy device occurs before a connection to the proxy device is established, and the connection between the apparatus and the proxy device is first requested by the proxy device; and
connect to a target device via the introducer server and the proxy device,
wherein an identifier of the apparatus is hidden from the target device, and the target device identifies the apparatus using an identifier of the proxy device,
wherein the proxy device is a mobile device having a non-static or unpredictable internet protocol address,
wherein the connecting to the target device comprises using the internet protocol address of the apparatus,
wherein the apparatus accesses the internet using a WiFi base station, the internet protocol address of the proxy device is assigned by the WiFi base station, the internet protocol address is non-routable, and the internet protocol address changes as the apparatus accesses the internet using a different WiFi base station, and
wherein the internet protocol address of the apparatus is associated with a network of the WiFi base station.

18. The apparatus according to claim 17, wherein the establishing the connection with the proxy device comprises connecting to the proxy device through the introducer server.

19. The apparatus according to claim 17, wherein the identifier of the proxy device is provided by a service provider of the mobile device.

20. The apparatus according to claim 17, wherein the internet protocol address of the proxy device is a dynamic internet protocol address.

21. The apparatus according to claim 17, wherein the proxy device is connected to a network behind a Network Address Translation server.

22. A computer program product, embodied on a non-transitory computer readable medium, the computer program product configured to control a processor to perform a process, comprising:
initiating, by a user computer, a connection with an introducer server after a connection to the introducer server is initiated by a proxy device, wherein the initiating by the proxy device occurs before a connection to the proxy device is established, and the connection between the user computer and the proxy device is first requested by the proxy device; and
connecting to a target device via the introducer server and the proxy device,
wherein an identifier of the user computer is hidden from the target device, and the target device identifies the user computer using an identifier of the proxy device,
wherein the proxy device is a mobile device having a non-static or unpredictable internet protocol address,
wherein the connecting to the target device comprises using the internet protocol address of the proxy device,
wherein the proxy device accesses the internet using a WiFi base station, the internet protocol address of the proxy device is assigned by the WiFi base station, the internet protocol address is non-routable, and the internet protocol address changes as the proxy device accesses the internet using a different WiFi base station, and
wherein the internet protocol address of the proxy device is associated with a network of the WiFi base station.

* * * * *